United States Patent [19]

Matson

[11] 4,174,374

[45] Nov. 13, 1979

[54] MAINTAINING THE SEPARATION EFFICIENCY OF IMMOBILIZED LIQUID MEMBRANES IN GAS SEPARATION METHODS AND APPARATUS

[75] Inventor: Stephen L. Matson, Schenectady, N.Y.

[73] Assignee: General Electric Company, Schenectady, N.Y.

[21] Appl. No.: 934,013

[22] Filed: Aug. 16, 1978

Related U.S. Application Data

[62] Division of Ser. No. 809,116, Jun. 22, 1977, Pat. No. 4,114,408.

[51] Int. Cl.² ............................................. B01D 53/34
[52] U.S. Cl. .................................... 423/232; 423/210; 423/220; 55/16
[58] Field of Search ....................... 423/210, 232, 220; 55/16

[56] References Cited

U.S. PATENT DOCUMENTS

| | | | |
|---|---|---|---|
| 3,396,501 | 8/1968 | Ward et al. | 55/16 |
| 3,564,819 | 2/1971 | Neulander et al. | 55/158 |
| 3,819,806 | 6/1974 | Ward et al. | 423/220 |
| 4,015,653 | 4/1977 | Steigelmann et al. | 55/16 |
| 4,032,309 | 6/1977 | Salemme | 55/158 |
| 4,047,908 | 9/1977 | Steigelmann et al. | 55/158 |
| 4,089,653 | 5/1978 | Ward | 423/232 X |
| 4,115,514 | 9/1978 | Ward | 423/232 |
| 4,119,408 | 10/1978 | Matson | 422/169 |

Primary Examiner—Earl C. Thomas
Attorney, Agent, or Firm—Richard G. Jackson; Joseph T. Cohen; Paul R. Webb, II

[57] ABSTRACT

Disclosed are an improved method and apparatus employing at least one immobilized liquid membrane separated from a liquid sweep by a gas-permeable barrier for removing a gaseous component from a gaseous mixture. The improvements include use of one or more liquid-filled passages extending through the gas-permeable barrier to effect diffusive transfer of active carrier species from the liquid sweep into the membrane, thereby maintaining the separation efficiency of each membrane. In a preferred embodiment, the improvements are applied to removal of hydrogen sulfide from mixtures thereof with carbon dioxide as found in gasified coal.

9 Claims, 2 Drawing Figures

MAINTAINING THE SEPARATION EFFICIENCY OF IMMOBILIZED LIQUID MEMBRANES IN GAS SEPARATION METHODS AND APPARATUS

This is a division of application Ser. No. 809,116, filed June 22, 1977, (now U.S. Pat. No. 4,114,408).

BACKGROUND OF THE INVENTION

This invention relates to a new improved method and apparatus employing at least one immobilized liquid membrane separated from a liquid sweep by a gas-permeable barrier for removing a gaseous component from a gaseous mixture. More particularly, the improvements include use of one or more passages extending through the gas-permeable barrier to effect transfer of active carrier species from the liquid sweep into the membrane, thereby maintaining the separation efficiency of each membrane.

Reference is made to copending application U.S. Ser. No. 806,845, filed June 15, 1977 (Walmet et al.), and now abandoned, which generally relates to an improved method and apparatus for maintaining the separation efficiency of an immobilized liquid membrane (ILM) including introducing fresh liquid into a first region of the membrane to effect emission of at least partially deactivated liquid from a second region of the membrane. The referenced application, which is assigned to the assignee hereof, is incorporated herein by reference.

A gas separation method and apparatus employing a feed gas mixture, an ILM, a liquid sweep, and a gas-permeable barrier disposed between the ILM and the liquid sweep are described in Ward application, U.S. Ser. No. 599,872, filed July 28, 1975, and now abandoned, assigned to the assignee of this invention, incorporated herein by reference, and hereinafter designated "Ward-A". The ILM in the Ward-A application contains in the liquid thereof at least one carrier species which is reversibly chemically reactive with the component to effect facilitated transport of the component through the membrane. The gas-permeable barrier specifically described therein is of a hydrophobic microporous material, which is substantially nonwettable by aqueous membrane liquids.

The method and apparatus of the Ward-A application are described therein with specific reference to removing hydrogen sulfide from a mixture of gases including carbon dioxide, e.g., coal gas. As described in Ward-A, a particularly suitable ILM for selectively removing hydrogen sulfide is an aqueous alkaline solution of potassium carbonate and potassium bicarbonate disposed in a microporous matrix layer of hydrophilic (i.e., wettable by the aqueous solution) composition.

Although the Ward-A method and apparatus are substantial advances in the art, it has been found that contact of coal gas, i.e. gasified coal, with the ILM results in deactivation of the membrane liquid. Such deactivation is believed to result from reaction of oxygen contained in the coal gas with hydrogen sulfide in the liquid membrane to form acidic sulfur oxides, such as sulfites, sulfates and thiosulfates, which neutralize the alkaline carbonate/bicarbonate carrier species of the aqueous membrane liquid. Accordingly, there is a substantial need in the art for a method and apparatus by which the gas separation efficiency or selective permeability through a facilitated-transport ILM may be maintained.

As indicated in Ward-A, the method and apparatus described therein can be made more selective to $H_2S$ removal by adding gas barriers between adjacent ILM layers in the manner described in allowed copending Ward application U.S. Ser. No. 599,871 (now U.S. Pat. No. 4,089,653), filed July 28, 1975, assigned to the assignee hereof and incorporated herein by reference (hereinafter "Ward-B"). That is, a membrane assembly including two ILM's having a gas-permeable barrier layer therebetween can be substituted for the single ILM in the Ward-A apparatus and method, thereby resulting in a sequential arrangement of an ILM/barrier/ILM/barrier. When multiple ILM's are employed in such an arrangement, it is more difficult to maintain the gas separation efficiency or selective permeability.

Additional background description of employment of ILM's for selectively separating hydrogen sulfide from a mixture of gases is provided by Ward et al. in U.S. Pat. No. 3,819,806, which is incorporated herein by reference.

It has now been found by practice of the present invention that substantial improvements for maintaining the separation efficiency of the above-described methods and apparatus are provided in simple efficient manner.

DESCRIPTION OF THE INVENTION

Generally stated, in one aspect, the present invention provides that in the heretofore known apparatus for selectively removing a gaseous component from a gaseous mixture, including:

an ILM containing in the liquid thereof a species which is reversibly chemically reactive with the gaseous component;

a gas-permeable barrier which is substantially impervious to the liquid, the barrier being disposed with a surface thereof in opposing relationship to a surface of the ILM;

means for contacting the gaseous mixture with an opposite surface of the ILM; and means for conducting a flow of sweep liquid along an opposite surface of the gas barrier to absorb gases emerging therefrom;

the separation efficiency of the ILM is substantially maintained or restored by the improvement of this invention which comprises:

the barrier has at least one passage, and preferably a plurality of passages, extending from the first to the second surface thereof; and the passage is of a size effective for receiving the sweep liquid therein such that the sweep liquid communicates with the membrane through the passage, whereby a quantity of the reactive species contained in the sweep liquid is diffusively transferred therefrom through the passage into the liquid immobilized in the membrane.

In a preferred embodiment, the Ward-B ILM/gas-permeable barrier/ILM sandwhich is substituted for the ILM in the improved apparatus of this invention to provide an ILM/barrier/ILM/barrier structure disposed between the membrane-mixture contacting means and the sweep liquid flow means. In this embodiment, each of the gas-permeable barriers is provided with at least one passage, and preferably a plurality of passages, therethrough.

Generally stated, in another aspect, the present invention provides substantial improvements in the heretofore known method for removing a gaseous component from a gaseous mixture, which method includes:

(A) contacting the mixture with an ILM containing in the liquid thereof at least one carrier species which is reversibly chemically reactive with the gaseous component to effect facilitated transport thereof through the membrane to a gas-permeable barrier which is substantially impervious to the liquid;

(B) passing the gases emerging from the ILM through the gas-permeable barrier; and (C) absorbing in a sweep liquid the gases emerging from the barrier.

The separation efficiency of the membrane in this method is substantially maintained or restored by the improvement of the present invention, comprising:

(a) the barrier has at least one passage extending transversely therethrough;

(b) the sweep liquid contains an amount of the carrier species; and (c) the sweep liquid is contacted with the ILM through the passage to effect diffusional transfer of at least a portion of the reactive species from the sweep liquid into the liquid immobilized in the ILM.

In a preferred embodiment of the improved method of this invention, substantial improvements are provided in a known variation of the above method. The variation further includes, between steps B and C, sequentially repeating steps A and B using an additional ILM and an additional gas-permeable barrier.

The separation efficiency of the membranes is substantially maintained or restored by the improvement comprising:

(a) each of the barriers has at least one passage extending transversely therethrough;

(b) the sweep liquid contains an amount of the reactive species; and (c) the sweep liquid is contacted with the additional ILM through the passage in the additional barrier and is in diffusional flow communication with the first ILM through the passage in the first barrier to effect transfer of at least a portion of the reactive species from the sweep liquid into the immobilized liquids in both ILM's.

BRIEF DESCRIPTION OF THE DRAWING

Practice of the present invention will become more fully apparent by having reference to the following detailed description taken in conjunction with the accompanying drawing, wherein.

DETAILED DESCRIPTION OF THE INVENTION AND MANNER AND PROCESS OF MAKING AND USING IT

Figure 1:
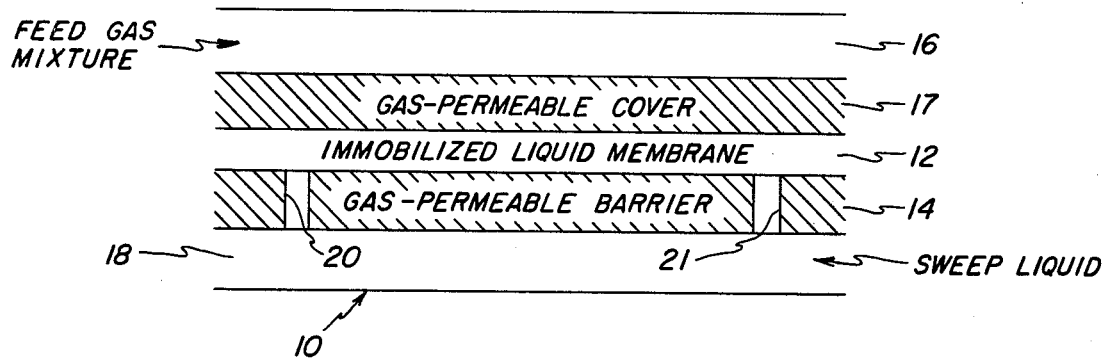
FIG. 1 is a schematic view illustrating apparatus embodying the present invention and containing a single ILM, a sweep liquid chamber, and an intermediately disposed gas-permeable barrier provided with through-holes.

Referring now to the drawing, FIG. 1 illustrates apparatus 10 for removing a gaseous component from a gaseous mixture. Apparatus 10 includes immobilized liquid membrane (ILM) 12 containing in the liquid thereof at least one carrier species which is reversibly chemically reactive with the gaseous component being preferentially removed. Gas-permeable barrier 14 is disposed with a first surface thereof in opposing relationship to a first surface of the ILM, the surfaces preferably being in intimate contact. In the orientation shown in FIG. 1, the ILM is mechanically supported by the gas-permeable barrier, which also serves to contain the liquid in the ILM under positive feed-to-sweep pressure differentials. A continuously flowing gaseous feed mixture, which may contain hydrogen sulfide and carbon dioxide as in the case of gasified coal, is admitted into flow chamber 16 which conducts the gaseous mixture along and in contact with the outer surface of ILM 12. In coal gas service, gas-permeable cover 17 may be provided intermediate chamber 16 and ILM 12 to aid in keeping the ILM free of particulates. Where the cover is included, the gaseous feed mixture is conducted therealong to indirectly contact the mixture with the ILM. A continuously flowing sweep liquid, which may be a solution, is passed through flow chamber 18 which conducts the liquid along and in contact with the outer surface of barrier 14.

The gas-permeable barrier 14 and, where included, the gas-permeable cover 17 are of substantially liquid-impervious material, i.e. substantially impervious to the ILM liquid. In a preferred embodiment the material is microporous and at least substantially nonwettable by the liquid contained in the ILM. If, as preferred, an aqueous liquid is immobilized in the ILM, the gas-permeable barrier and conver may be of microporous hydrophobic material such as Teflon, a trademark of E. I. DuPont de Nemours & Co. for fluorinated hydrocarbon polymers, typically of the type designated GORE-TEX, a trademark of W. L Gore & Associates, Inc., Newark, De.

The diameter of the largest pore in the microporous material employed as the barrier should be sufficiently small such that the initiation pressure of the material relative to a given sweep liquid exceeds the sweep liquid pressure, preferably by at least 100 psi. As used herein, "initiation pressure" means the minimum positive pressure differential from the pressure of liquid in contact with a surface of the microporous material to the pressure in the micropores at which the liquid will enter the micropores. Microporous materials having such an initiation pressure will preclude wetting of the barrier by the liquid in the ILM and the sweep liquid. In general, if the sweep liquid pressure is 300 psi or more, the maximum pore diameter of the gas-permeable barrier should be 500 Angstroms or less to substantially preclude barrier wetting. If the barrier is wet through by the liquid in the membrane or the sweep liquid, the permselectivity of the ILM/barrier assembly is typically sacrificed in the wet regions.

The preferred composition of ILM 12 for removing hydrogen sulfide is described in detail in Ward et al. U.S. Pat. No. 3,396,510 and Ward et al. U.S. Pat. No. 3,819,806, the descriptions of which are hereby incorporated by reference. In one embodiment, the ILM described in U.S. Pat. No. 3,819,806 and employed in the present invention comprises a matrix layer having interconnecting micropores occupied by an aqueous solution. Solutions used to make ILM's of this type have been prepared from distilled water and a mixture of potassium carbonate and potassium bicarbonate as described therein. The microporous matrix is made of a hydrophilic material (i.e., wet by the particular solution employed). Commercially available microporous materials useful for this purpose are those sold, for example, under the trademark Solvinert by Millipore Corporation, Bedford, Mass., and under the trademark Acropor by Gelman Instrument Co., Ann Arbor, Mich. A highly suitable hydrophilic material for the ILM matrix is microporous polyethersulfone. In removing hydrogen sulfide from gasified coal in the above-described apparatus of the prior art, it is found that the ILM typically tends to become at least partially deactivated, as for example by deleterious reactions of oxygen from the coal gas with hydrogen sulfide passing through the ILM.

It is found that separation efficiency of the ILM is substantially maintained by an improvement including the provision of at least one discrete passage through the gas-permeable barrier, illustrated by a plurality of discrete passages 20 and 21 extending through the barrier. The passages are of a size at least effective for receiving the sweep liquid therein to establish the ILM/sweep liquid diffusional flow communication described below. In general, the diameter of each passage is from about 0.1 to about 5000 microns, preferably from about 10 to about 1000 microns. The combined transverse area of the passages may be from about 0.001 to about 20 percent (%), preferably from about 0.1 to about 5%, of the area of one surface of the barrier. Within these ranges, larger areas are desirably employed for offsetting high deactivation rates. In operation combined passage areas above 20% unduly replace active barrier area with liquid-wet barrier regions. The number of passages may be such that the passage number density is from about 0.1 to about 500, preferably from about 1 to about 50, passages per square inch of one surface of the barrier. When the sweep liquid flow is begun along and in contact with the gas-permeable barrier, a sufficient portion of the sweep liquid enters and extends entirely along the axial extent of the one or more through-passages, preferably filling the passages.

The sweep liquid is selected to include a quantity of the reversibly reactive carrier species (e.g. $CO_3^{--}$ and/or $HCO_3^-$ ions) employed in the liquid of the membrane for facilitating transport of the gaseous component (e.g. $H_2S$) therethrough. The sweep liquid in chamber 18 is in carrier-diffusional flow communication with the liquid in the membrane through the liquid contained in the passages whereby a quantity of the reactive carrier species contained in the sweep liquid is diffusively transferred therefrom through the passage into the liquid in the membrane. Simultaneously, deleterious species (e.g. sulfates sulfites, thiosulfates and the like) formed in the membrane, if any, are typically found to be diffusively transferred from the membrane through the passages into the sweep liquid. That is, counterdiffusion of active carrier species into the membrane and inactive species out of the membrane is effected by flow of sweep liquid through chamber 18. In general, the concentration of the carrier species in the sweep liquid supply is higher than the desired concentration thereof in the membrane liquid, thereby establishing a suitable concentration gradient in respect to the species from the sweep liquid to the membrane liquid. The sweep liquid is preferably substantially identical in composition to the initial composition of the immobilized liquid membrane.

Figure 2:
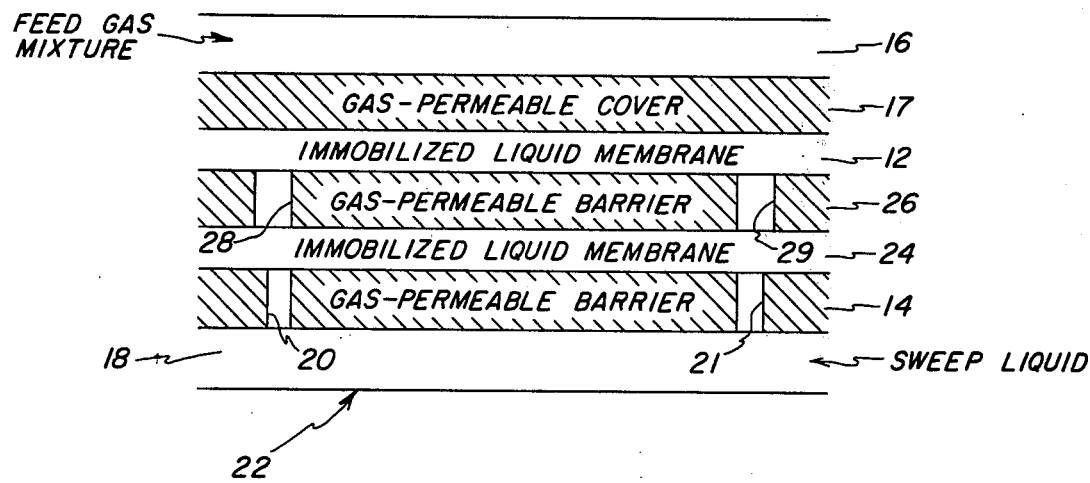
FIG. 2 is a schematic view illustrating another embodiment of the present apparatus and containing an ILM/gas-permeable barrier/ILM assembly, a sweep liquid chamber, and an intermediately disposed gas-permeable barrier, both barriers having holes therethrough.

FIG. 2 illustrates apparatus 22, which may be substantially identical to apparatus 10 (FIG. 1) except as hereinafter provided. Apparatus 22 includes second immobilized liquid membrane 24 which may be substantially identical to ILM 12, the second ILM containing in the liquid thereof an amount of the carrier species employed in ILM 12. The second ILM is disposed between the first ILM 12 and the first barrier 14, with a first surface of the second ILM being in contact with the inner surface of barrier 14. Apparatus 22 further includes a second gas-permeable barrier 26 which is, as in the case of barrier 14, non-wettable by the liquid in the ILM's. Barrier 26 is disposed between ILM's 12 and 24, with one surface of the barrier being in contact with the first surface of ILM 12 and the other surface of the barrier being in contact with a second surface of ILM 24. Barrier 26 has at least one discrete passage, illustrated by discrete passage 28 and 29, extending from the first to the second surface thereof. This passage or passages are of a size effective for receiving therein liquid pressured out of the membrane 24 by the sweep liquid. If desired, additional ILM/passage-containing barrier pairs may be interposed between the feed and sweep chambers.

In operation, a sweep liquid under at least a slight pressure (e.g. one p.s.i. or more) is introduced into chamber 18, with a portion of the liquid entering and preferably substantially filling holes 20 and 21, whereby liquid in membrane 24 is forced outwardly therefrom into and extending entirely along the axial extent of passages 28 and 29, preferably filling them. The sweep liquid is thereby placed into carrier-diffusional flow communication through passages 20 and 21 with membrane 24 and into carrier-diffusional flow communication with ILM 12 through passages 20 and 21, ILM 24, and passages 28 and 29. For best results, passages 28 and 29 in the barrier interposed between the two ILM's are preferably in alignment with the passages 20 and 21 in the barrier 14. The passages through the two ILM's may be of the same or different diameter. A sweep liquid pressure which is slightly in excess (e.g. 1-2 psi) of the pressure of the feed gas mixture supplied to chamber 16 is preferably employed to aid in establishing the diffusional flow communication.

The one or more ILM's employed herein may be from about 0.1 to about 10 mils in thickness. The various gas-permeable barriers and, where included, the gas-permeable cover are typically from about 0.1 to about 10 mils in thickness.

The passages may be provided through the various gas-permeable barriers by any suitable means. One convenient method is to form the passages by exposing the barriers in preselected spaced apart regions to the arc discharge of a Tesla coil. After forming the holes or passages, the resulting barrier or barriers may be interleaved with the one or more ILM's as desired to provide the membrane assembly employed in the apparatus.

A preferred liquid sweep stream for use in apparatus of this invention provided with ILM's initially containing 30% aqueous bicarbonate/carbonate solution is 30% aqueous $K_2CO_3$ solution. In the case of $H_2S$-bearing coal gas, ingredients including, for example, oxygen, carbon monoxide, sulfur dioxide, and hydrocyanic acid typically undergo side reactions with the alkaline carbonate/bicarbonate membrane liquid or with $H_2S$ passing therethrough, resulting in partial or complete neutralization of the membrane liquid. For example, oxygen present at 1000-2000 ppm in coal gas at 300 psig reacts with $H_2S$ absorbed in a polyethersulfone membrane containing nominally 30% $K_2CO_3$ in the aqueous liquid thereof to form soluble species such as thiosulfate and sulfate which are ineffective for facilitating $H_2S$ transport.

In a control test simultating coal gas service (gas mixture containing, in mole %, about 0.9% $H_2S$, 10% $CO_2$, 2.5% water vapor, 0.22% $O_2$ and the balance $N_2$), membrane permeability to $H_2S$ was observed to decrease substantially within a brief period, e.g., less than 72 hours. That is, $H_2S$ permeability decreased more than 96% from above 5000 units to about 200 units in 65 hours after start-up. The units are:

$$\frac{CC(STP)H_2S/\text{sec} \times \text{cm (thickness of } ILM)}{\text{cm}^2 \text{ (area of } ILM) \times \text{cm Hg } (\Delta P \text{ across } ILM)} \times 10^{-9}.$$

The foregoing results were obtained using a membrane package substantially as described in Neulander et al., U.S. Pat. No. 3,564,819, incorporated herein by reference, having one membrane assembly substantially as illustrated in FIG. 1 hereof (except without passages of this invention in the gas-permeable barrier). Two contiguous ILM's of microporous polyethersulfone membrane material were employed, each about 1.8 mils in thickness and having a pore size gradient ranging from 0.05 micron on one side to about 50 microns on the other side, with a water solution of 30% $K_2CO_3$ immobilized in each ILM. The gas-permeable cover and barrier each were of microporous GORE-TEX material, 2.5–3 mils in thickness and of a specified initiation pressure of 350–500 psi (nominal 0.02–0.03 micron pore size). The exposed ILM surface area was 25.3 cm². The feed was supplied at 315 psi and 90° C. at a flow rate of 0.0135 grams per second (g/sec) while the sweep liquid (30% aqueous $K_2CO_3$ solution) was supplied at 313 psi and 90° C. at a flow rate of 0.075 g/sec. A polyester monofilament screen, about 7 mils in thickness and having mesh openings of about 200 microns and about 44% open area, was employed in the feed gas chamber. A stainless steel screen of similar dimensions was employed in the sweep chamber. At the end of the 65 hour test, titration of the ILM's salts (extracted with distilled water) with 0.1 N HCl showed that the ILM alkalinity had decreased 98 percent from 0.33 millimoles of $K_2CO_3$ to 0.0068 millimoles of equivalent $K_2CO_3$, further showing substantial ILM deactivation.

The foregoing test was repeated except that the GORE-TEX gas-permeable barrier membrane 14 (FIG. 1) was provided with a rectangular array of six uniformly spaced 0.7-millimeter diameter circular holes, the area of the holes constituting 0.09% of the active membrane area. The permeability to $H_2S$ decreased only about 20% within 4–6 hours from approximately 3900 units to about 3240 units (corresponding to a $H_2S/CO_2$ separation factor of about 21) and was maintained thereat for over 700 hours. (Such initial decreases in permeability are typical even in the absence of deactivating side reactions). During the test the oxygen partial pressure in the feed gas mixture averaged about 0.55 psi (about 0.18 mole percent). The ILM, the cover and the gas-permeable barrier were each about 1½ inches wide by 2½ inches long. The holes or passages were provided by puncturing the barrier with a hypodermic needle before assembling the ILM/barrier pair.

Another test was performed using the apparatus described in FIG. 2 hereof (two separated ILM's per assembly), each ILM having a thickness of 1.8 mils and otherwise the same as above described. Each of the two GORE-TEX membrane gas-permeable barriers 14 and 26 was provided with about 75 throughholes randomly spaced throughout, each about 0.060 millimeter in diameter, by means of a spark discharge from a Tesla coil. These holes, comprising only about 0.008% of the active membrane area, connected the two liquid membrane layers with each other and with the sweep liquid chamber. A small (about 1–2 psi) sweep-to-feed pressure drop across each membrane was applied during operation to assist membrane liquid in initially flowing through the sweep side polyethersulfone ILM and into the holes in the gas barrier disposed intermediately of the two ILM's. The hydrogen sulfide permeability, initially slightly more than 4000 units, fell only about 30% to approximately 2800 units within about 5–10 hours after start-up and was maintained substantially thereat for a period of over 200 hours. During this same period, the $CO_2$ permeability was maintained substantially constant at about 75 units, corresponding to a $H_2S/CO_2$ separation factor (permeability ratio) of about 37. This test showed that the $H_2S$ permeability and the separation factor were both maintained substantially high. Titration of the water-extracted ILM's further showed that substantially no ILM deactivation occurred in this test. (Each ILM contained about 0.20 millimoles of $K_2CO_3$ initially and about 0.22 millimoles of equivalent $K_2CO_3$ after 700 hours). The data evidences substantial maintenance of the separation efficiency of the ILM's in the apparatus of FIG. 2, a distinct and significant improvement provided by the apparatus and method of the present invention.

BEST MODE CONTEMPLATED FOR CARRYING OUT THE INVENTION

For any particular application employing microporous barrier material, the best combination of passage diameter and passage number density can be determined by routine experimentation aided by the following guidelines.

For best results, there are two criteria which the passage size should satisfy. First, the passage should be sufficiently large that it receives liquid from the adjacent lower ILM or sweep liquid stream—i.e., the passage must be "wet" with liquid in order that diffusional flow communication of all ILM's and the sweep liquid is achieved. Assuming a cylindrical passage, the minimum size which will satisfy this criterion can be calculated from the Young-Laplace equation:

$$r_c = 2\gamma \cos \Theta / (P_s - P_g) \qquad (1)$$

where:
  $r_c$ = critical radius for wetting in microns ($\mu$)
  $\gamma$ = surface tension of the sweep liquid (dynes/$\mu$)
  $\Theta$ = contact angle between the sweep liquid and the barrier material at the passage wall
  $P_s$ = pressure of the sweep liquid (dynes/$\mu^2$)
  $P_g$ = pressure in the micropores of the barrier (dynes/$\mu^2$)

The minimum suitable passage radius ("a") is equal to or greater than $r_c$ to satisfy the wetting criterion.

The second criterion for best results is that the combined liquid passage area A (expressed as a percent of the barrier surface and given by the equation:

$$A = n\pi a^2 \times 100\% \qquad (2)$$

where "n" is the passage number density described above (units = cm$^{-2}$) and "a" is the passage radius (cm)) be sufficiently large such that the resistance to carrier species diffusion axially of the passage not be excessive. That is, it is desirable to minimize the concentration difference in carrier species between the sweep stream and ILM liquids. Two calculated values of passage radius "a", i.e. $a_1$ (Eq.1) and $a_2$ (Eq.2), result from these two criteria. The preferred minimum passage size is the larger of these two values for maximum maintenance of separation efficiency.

However, in order to calculate $a_2$ it is necessary to have values for "n" and "A". The passage number density ("n") is preferably set sufficiently high such that differences in carrier species concentration within the plane of the ILM will be minimal. The difference in carrier species concentration between that at a point in the ILM midway between two nearest-neighbor passages ($C_m$) and that at a passage site ($C_o$) is given by the equation:

$$(C_o - C_m) = \frac{R}{4D}(b^2 - a^2) + \frac{Rb^2}{2D}\ln(\frac{a}{b}) \quad (3)$$

Where: $C_o$ and $C_m$ are expressed in g-moles per cc of ILM liquid, "R" is the volumetric rate of carrier species destruction in the deactivation process (g-moles of specie/(sec.×cc of ILM liquid), "D" is the effective carrier species diffusivity in the ILM matrix (cm$^2$/sec.), "b" is half the distance between two passages (cm), and "a" is the passage radius (cm).

Equation (3) can be solved for "b", employing an experimentally derived value of "R" for the given application and taking "a" to be "$r_c$" from Equation 1. "D" can be readily experimentally determined or, if desired, estimated from bulk diffusivity of the species and porosity and tortuosity of the ILM matrix. A plot of permeability of the component to be removed vs. carrier species concentration in the ILM should be made from experimental observations thereof without deactivating components present in the feed mixture. A tolerable decrease in ILM steady-state permeability is specified and the corresponding tolerable decrease in carrier species concentration in the ILM is read from the plot. The resulting species concentration may be taken as an estimate of "$C_m$". A concentration of the species to be employed in the sweep liquid ($C_s$ in g-moles per cc.) is selected (at some value above "$C_m$", e.g. 110% of $C_m$) and "$C_o$" is selected at a value between "$C_s$" and "$C_m$", e.g. midway therebetween.

After the distance "b" is determined, a value of "n" may be calculated from the equation:

$$n = 1/\pi b^2, \quad (4)$$

where "n" and "b" are defined above.

A value for the combined passage area "A" taken transversely of passage axes may then be calculated from the equation:

$$(C_s - C_o) = Rdt \times 100\%/AD \quad (5)$$

Where $C_s$, $C_o$, A, D and R are defined above, "d" is the ILM thickness (cm) and "t" is the length (cm) of the diffusion path between the sweep liquid chamber or channel and the ILM. The term ($C_s - C_o$) is obtained by subtracting the term ($C_o - C_m$) employed in Equation (3) from the total concentration gradient ($C_s - C_m$) previously determined.

Having values for "n" and "A", "$a_2$" can now be calculated from Equation (2). If "$a_2$" is less than or equal to "$a_1$", values of "n", "A", and "a" as calculated above may be employed to provide highly effective maintenance of separation efficiency. If "$a_2$" is more than "$a_1$", it is desirable to repeat the calculations in Equations (3), (4) and (5), employing "$a_2$" as "a" in Equation (3), to arrive at better values of "n" and "A". However, as will be apparent to those skilled in the art, there is considerable latitude in selecting passage size (provided that "a" is more than "$r_c$") and number density consistent with a given total carrier species concentration difference ($C_s - C_m$) as determined above. That is, this total concentration difference may be divided in various proportions into the two concentration differences, ($C_s - C_o$) and ($C_o - C_m$), responsible for carrier species diffusion along the passage axes and within the plane of the ILM, respectively. The estimation procedure detailed here provides a unique pair of values for passage size and passage number density for each assigned distribution of the overall concentration difference ($C_s - C_m$) between its two parts. The optimum combination of passage size and passage number density is largely determined by the economics of membrane manufacture.

Equations (3) and (5) above are based on zero-order deactivating reaction kinetics. Similar equations for other kinetics can be employed to fit appropriate applications.

While the above equations are useful for guidance, experimental verification that a given passage-containing barrier design is effective in maintaining ILM liquid activity is desirable. Furthermore, over-sizing is recommended if the combined passage area "A" determined above is much smaller than that at which ILM permselectivity would be substantially reduced in a given application.

It is to be understood that the foregoing detailed description is given merely by way of illustration and that numerous modifications may be made therein without departing from the spirit and scope of the present invention.

What is claimed is:

1. In a method for removing a gaseous component from a gaseous mixture comprising:
  contacting said mixture with an immobilized liquid membrane containing in the liquid thereof at least one carrier species which is reversibly chemically reactive with said component to effect facilitated transport of said component through said membrane to a gas-permeable barrier which is substantially impervious to said liquid;
  passing the gases emerging from said membrane through said gas-permeable barrier; and
  absorbing in a sweep liquid the gases emerging from said gas-permeable barrier;
  the improvement for substantially maintaining the separation efficiency of said membrane; comprising:
  said sweep liquid containing a quantity of said carrier species; and
  said sweep liquid being contacted with said immobilized liquid membrane through a discrete passage extending transversely through said barrier, to effect diffusive transfer of at least a portion of said reactive species from said sweep liquid into the liquid immobilized in said membrane.

2. The improvement of claim 1, wherein said barrier is microporous and substantially non-wettable by said liquid.

3. The improvement of claim 1, wherein said gaseous component is hydrogen sulfide and said immobilized liquid is an aqueous solution containing carbonate and bicarbonate ions as the carrier species.

4. The improvement of claim 1, wherein said sweep liquid is continually passed along and in contact with the barrier surface from which the gases emerge to continually maintain separation efficiency of said membrane.

5. In a method of removing a gaseous component from a gaseous mixture, comprising:

contacting said mixture with a first immobilized liquid membrane containing in the liquid at least one reactive species which is reversibly chemically reactive with said gaseous component to effect facilitated transport of said component through said first membrane to a first gas-permeable barrier which is substantially impervious to said liquid;

passing the gases emerging from said first membrane through said first gas-permeable barrier; and contacting gases emerging from said first gas-permeable barrier with a second immobilized liquid membrane containing in the liquid thereof a quantity of said reactive species to effect facilitated transport of said gaseous component through said second membrane;

the improvement for substantially maintaining separation efficiency of said membranes, comprising:

(a) passing gases emerging from said second membrane through a second gas-permeable barrier, (b) absorbing in a sweep liquid the gases emerging from said second gas-permeable barrier, (c) each of said barriers having at least one discrete passage extending transversely therethrough, (d) said sweep liquid containing an amount of said reactive species, and (e) said sweep liquid being contacted with said second membrane through the passage in said second barrier and being in diffusional flow communication with the liquid in said first membrane through the passage in said first barrier to effect transfer of at least a portion of said reactive species from said sweep liquid into both the immobilized liquid in said first membrane and the immobilized liquid in said second membrane.

6. The improvement of claim 5, wherein said gaseous component is hydrogen sulfide and the immobilized liquid in each of said membranes is an aqueous solution containing carbonate and bicarbonate ions as the carrier species.

7. The improvement of claim 5, wherein said sweep liquid is continually passed along and in contact with the surface of said second barrier from which the gases emerge.

8. The improvement of claim 5, wherein the pressure of the sweep liquid is at least slightly higher than the pressure of the gaseous mixture.

9. The improvement of claim 5, wherein each of said barriers is microporous and substantially non-wettable by said liquid.

* * * * *